United States Patent
Di Ianni et al.

(10) Patent No.: US 10,302,752 B2
(45) Date of Patent: May 28, 2019

(54) VECTOR VELOCITY ESTIMATION USING TRANSVERSE OSCILLATION (TO) AND SYNTHETIC APERTURE SEQUENTIAL BEAMFORMING (SASB)

(71) Applicant: B-K MEDICAL APS, Herlev (DK)

(72) Inventors: Tommaso Di Ianni, Copenhagen N (DK); Martin Hemmsen, Virum (DK); Jorgen Arendt Jensen, Horsholm (DK)

(73) Assignee: B-K Medical Aps, Herlev (DK)

( * ) Notice: Subject to any disclaimer, the term of this patent is extended or adjusted under 35 U.S.C. 154(b) by 132 days.

(21) Appl. No.: 15/252,632

(22) Filed: Aug. 31, 2016

(65) Prior Publication Data

US 2018/0059229 A1 Mar. 1, 2018

(51) Int. Cl.
*G01S 7/52* (2006.01)
*G01S 15/89* (2006.01)

(52) U.S. Cl.
CPC ...... *G01S 7/52095* (2013.01); *G01S 7/52053* (2013.01); *G01S 15/899* (2013.01); *G01S 15/8918* (2013.01); *G01S 15/8997* (2013.01)

(58) Field of Classification Search
None
See application file for complete search history.

(56) References Cited

U.S. PATENT DOCUMENTS

| | | | |
|---|---|---|---|
| 6,148,224 A | 11/2000 | Jensen | |
| 6,725,076 B1 | 4/2004 | Jensen | |
| 6,859,659 B1 | 2/2005 | Jensen | |
| 7,542,790 B2 * | 6/2009 | Jensen | G01S 7/52085 600/407 |
| 2006/0241490 A1 * | 10/2006 | Lazenby | A61B 8/4483 600/472 |

(Continued)

FOREIGN PATENT DOCUMENTS

WO PCT/IB2015/051526 3/2015

OTHER PUBLICATIONS

Li and Jensen, Synthetic aperture flow imaging using dual stage beamforming: Simulations and experiments, 2014 J. Acoust. Soc. Am 133 (4) Apr. 2013.

(Continued)

*Primary Examiner* — Hovhannes Baghdasaryan
(74) *Attorney, Agent, or Firm* — Anthony M. Del Zoppo, III; Daugherty & Del Zoppo Co., LPA

(57) ABSTRACT

An ultrasound imaging system includes a transducer array with a plurality of transducer elements configured to repeatedly emit in a predetermined pattern, a first beamformer configured to beamform echo signals received by the transducer array to produce a low resolution line of data for each emission, and a first communication interface configured to wirelessly transmit the low resolution lines of data for each emission in series. The ultrasound imaging system further includes a second communication interface configured to for each emission in series wirelessly receive the transmitted low resolution lines of data, a second beamformer configured to beamform the received low resolution lines of data to produce high resolution ultrasound data, and a velocity processor configured to estimate vector velocity components from the high resolution ultrasound data in a lateral direction and an axial using an autocorrelation algorithm.

20 Claims, 3 Drawing Sheets

(56) References Cited

U.S. PATENT DOCUMENTS

2011/0237953 A1\* 9/2011 Olsson .................. B06B 1/0207
600/459
2012/0179044 A1\* 7/2012 Chiang ................ A61B 8/0883
600/447

OTHER PUBLICATIONS

Hemmsen, et al., Implementation of real-time duplex synthetic aperture ultrasonograph, Proc. IEEE Ultrason. Symp., 2015, pp. 1-4.
Kortbek, et al., Synthetic aperture sequential beamforming, Proc. IEEE Ultrason. Symp., 2008, pp. 966-969.
Kortbek, et al., Sequential beamforming for synthetic aperture imaging, Ultrasonics, vol. 53, No. 1, pp. 1-16, 2013.
Jensen, J.A., Directional Velocity Estimation Using Focusing Along the Flow Direction I: Theory and Simulation, IEEE Trans on Ultrasonics, Ferroelectrics and Frequenty Control, vol. 50, No. 7, pp. 857-872, Jul. 2003.
Jensen, J.A., A New Method for Estimation of Velocity Vectors, IEEE Trans on Ultrasonics, Ferroelectrics and Frequenty Control, vol. 45, No. 3, pp. 837-851, May 1998.
Jensen, J.A., Directional Synthetic Aperture Flow Imaging, IEEE Trans on Ultrasonics, Ferroelectrics and Frequenty Control, vol. 51, No. 9, pp. 1107-1118, Sep. 2004.

\* cited by examiner

VECTOR VELOCITY ESTIMATION USING TRANSVERSE OSCILLATION (TO) AND SYNTHETIC APERTURE SEQUENTIAL BEAMFORMING (SASB)

TECHNICAL FIELD

The following generally relates to ultrasound Vector Flow Imaging (VFI) and more particularly to estimating vector velocity for flowing structures using a combination of TO and SASB dual stage beamforming.

BACKGROUND

The visualization of blood flow dynamics is an important and effective clinical tool for the diagnosis of a number of pathological conditions. Ultrasound scanners are capable of estimating 2-D velocity vectors in real-time, allowing clinicians to extract useful information from complex flow patterns. The feasibility of a real-time duplex imaging sequence in a commercial consumer level tablet was demonstrated in Hemmsen et al., "Implementation of real-time duplex synthetic aperture ultrasonography," in Proc. IEEE Ultrason. Symp., 2015, pp. 1-4. In Hemmsen et al., the approach was based on synthetic aperture sequential beamforming (SASB). The ultrasound data were transferred wirelessly to a tablet where processing and visualization were performed. The estimation was based on directional beamforming, and the lines were cross-correlated to find the velocities. Unfortunately, this approach requires a flow angle estimation and all permutations need to be cross-correlated, which is time and computationally intensive. As such, this approach is not well-suited for fully operative real-time imaging, and there is an unresolved need for another approach.

SUMMARY

Aspects of the application address the above matters, and others.

In one aspect, an ultrasound imaging system includes a transducer array with a plurality of transducer elements configured to repeatedly emit in a predetermined pattern, a first beamformer configured to beamform echo signals received by the transducer array to produce a low resolution line of data for each emission, and a first communication interface configured to wirelessly transmit the low resolution lines of data for each emission in series. The ultrasound imaging system further includes a second communication interface configured to for each emission in series wirelessly receive the transmitted low resolution lines of data, a second beamformer configured to beamform the received low resolution lines of data to produce high resolution ultrasound data, and a velocity processor configured to estimate vector velocity components from the high resolution ultrasound data in a lateral direction and an axial using an autocorrelation algorithm.

In another aspect, a method includes transmitting an ultrasound signal, receiving echoes generated in response to the transmitted ultrasound signal, beamforming the echoes, generating a low resolution line of data for each emission, and wirelessly transmitting the low resolution lines of data to another device. The method further includes wirelessly receiving the transmitted low resolution lines of data with the other device, beamforming the low resolution line of data, generating high resolution ultrasound image data, and estimating, using an autocorrelation algorithm, vector velocity components from the high resolution ultrasound data.

In another aspect, a non-transitory computer readable storage medium is encoded with computer readable instructions. The computer readable instructions, when executed by a processor of a computing system, cause the processor to: transmit, via a transducer array, an ultrasound signal, receive, via the transducer array, echoes generated in response to the transmitted ultrasound signal, beamform the echoes and generate a low resolution line of data for each emission, and wirelessly transmit the low resolution lines of data to another device. The computer readable instructions, when executed by the processor of the computing system, further cause the processor to: wirelessly receive the transmitted low resolution lines of data with the other device, beamform the low resolution line of data and generate high resolution ultrasound image data, and estimate, using an autocorrelation algorithm, vector velocity components from the high resolution ultrasound data.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

The following describes an approach for VFI vector velocity estimation based on a combination of TO or DTO and SASB. In one instance, this approach allows for efficient wireless transmission of low resolution ultrasound data along with a subsequent efficient estimation of velocities therefrom. The approach is based on an autocorrelation approach, which requires a decreased amount of calculations with respect to cross-correlation. The approach makes it possible to have continuous data acquisition in the whole imaged area; therefore, high and low velocities can be estimated at once with high precision and high frame rate.

Figure 1:
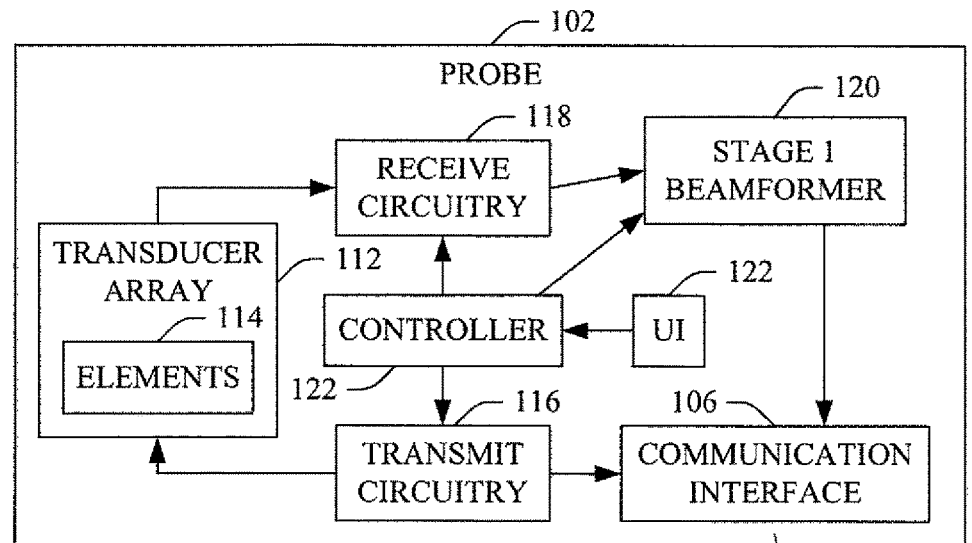
FIG. 1 schematically illustrates an example ultrasound imaging system.
Figure 1:
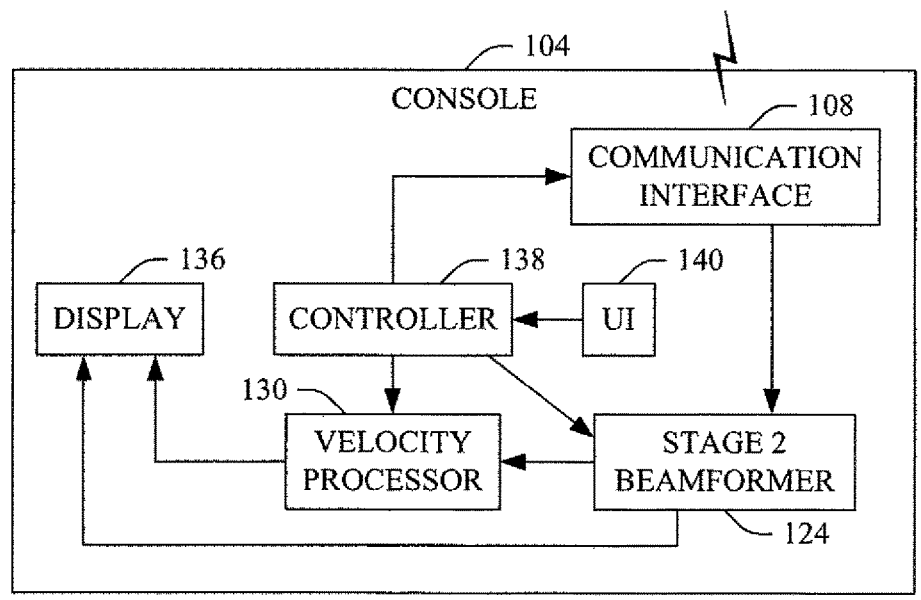

FIG. 1 schematically illustrates an example ultrasound imaging system 100. The imaging system 100 includes a probe 102 and console 104. The probe 102 includes a probe wireless communication interface ("communication interface") 106, and the console 104 includes a console wireless communication interface ("communication interface") 108. The communication interfaces 106 and 108 are configured to wirelessly communicate over a wireless network 110.

The probe 102 includes a transducer array 112 with a plurality of transducer elements 114, which are configured to transmit ultrasound signals. The plurality of transducer elements 114 are also configured to receive echo signals and generate electrical signals indicative thereof. The echo signals are produced in response to an interaction between the ultrasound signals and the structure (e.g., flowing blood cells, organ cells, etc.).

The transducer array 112 can be a one or two-dimensional (1-D or 2-D) array. Examples of 1-D arrays include arrays with 8, 16, 32, 64, 96, 128, 512, and/or other number of elements. Examples of 2-D arrays include square, rectangular, circular, irregular, row-column addressed and/or other arrays. The transducer array 112 can be linear, curved, phased, and/or other array. The transducer array 112 can be fully populated or sparse and/or a combination thereof.

Transmit circuitry 116 generates a set of pulses that are conveyed to the transducer array 112. The set of pulses excites a set of the transducer elements 114, which causes the elements 114 to emit ultrasound signals. Receive circuitry 118 receives the electrical signals. The receive circuitry 118 may amplify, filter, convert analog signals to digital signals, etc. The transducer array 112 may have separate transmit and receive elements, and/or a switch may switch between the transmit and receive circuitry 116 and 118.

For directional transverse oscillation (DTO), a focused beam is emitted and echoes are received by all of the transducer elements 114. As described below, the echoes are beamformed using two apodized apertures separated by a distance to create a lateral oscillation. A DTO approach is described in greater detail in international application serial number PCT/IB2015/051526, filed Mar. 3, 2015, and entitled "ULTRASOUND IMAGING FLOW VECTOR VELOCITY ESTIMATION WITH DIRECTIONAL TRANSVERSE OSCILLATION," which is incorporated herein by reference in its entirety.

The probe 102 includes a first stage (or stage 1) beamformer 120. The first stage beamformer 120 is configured to beamform the electrical signals for each emission using a fixed transmit and receive focus for continuous data acquisition in the whole image area. In one instance, the first stage beamformer 120 produces a single low-resolution line of data for each emission, which is transmitted serially by the interface 106 over the network 110 to the interface 108 at a data transfer rate commensurate with the IEEE 802.11ac (WiFi) wireless networking standard.

For example, if 25 frames per second (fps) are used for B-mode and the maximum frame rate for VFI is 480 fps at a depth of 10 cm, at full operational speed a data throughput of 320 megabits per second (Mbps) would be required. The IEEE 802.11ac (WiFi) wireless networking standard has a single-link throughput of at least 500 Mbps and a multi-station throughput of at least 1 gigabit per second (Gbps). In general, the interface 106 can transmit the low-resolution lines of data using any wireless networking standard having a data transfer rate suitable for serial transmission of the data. This includes, USB, Blue Tooth, cellular, etc.

In one instance, the first stage beamformer 120 employs an SASB algorithm to create the low-resolution lines of data. An example of a suitable SASB algorithm is described in Kortbek, et al., "Synthetic aperture sequential beamforming," in Proc. IEEE Ultrason. Symp., 2008, pp. 966-969. Another example of a suitable SASB algorithm is described in Kortbek, et al., "Sequential beamforming for synthetic aperture imaging," Ultrasonics, vol. 53, no. 1, pp. 1-16, 2013. Other algorithms, which create such low-resolution lines of data, are also contemplated herein.

The probe 102 further includes a probe controller ("controller") 122, which is configured to control the transmit circuitry 116, the receive circuitry 118, the stage 1 beamformer 120, and/or the probe wireless communication interface 106. Such control can be based on a current mode of operation (e.g., B-mode, velocity, vector velocity estimation using TO (e.g., DTO) with SASB). The probe 102 includes a user interface (UI) 140. The UI 140 may include an input device (e.g., a button, a slider, a touch surface, etc.) and/or an output device (e.g., a visual and/or audible, etc.).

The console 104 includes a second stage (stage 2) beamformer 124. The second stage beamformer 124 is configured to successively process the low-resolution lines of data, producing high resolution images. Such processing includes applying weights to create a double-oscillating field in the whole imaging region at once. The second stage beamformer 124 employs the SASB and/or other algorithms to create high resolution images.

A velocity processor 130 is configured to process the beamformed data and determine velocity components of flowing structure. This includes processing the beamformed data to determine a velocity component in the depth direction and/or in one or two directions transverse to the depth direction. As described in greater detail below, the velocity processor 130 estimates vector velocities based on a TO or DTO approach.

A display 136 displays the image and/or velocity information. Such presentation can be in an interactive graphical user interface (GUI), which allows the user to selectively rotate, scale, and/or manipulate the displayed data. Such interaction can be through a mouse or the like, and/or a keyboard or the like, touch-screen controls and/or the like, and/or other known and/or approach for interacting with the GUI.

The console 104 further includes a console controller ("controller") 138, which is configured to control the communication interface 108, the second stage beamformer 124, and/or the velocity processor 130. Such control can be based on a current mode of operation (e.g., B-mode, velocity, vector velocity estimation using TO (e.g., DTO) with SASB). The console 104 includes a user interface (UI) 140, which may include an input device (e.g., a button, a slider, a touch surface, etc.) and/or an output device (e.g., a visual and/or audible, etc.).

It is to be appreciated that the beamformers 120 and 124, the velocity processor 130, and/or other components of the system 100 can be implemented via a processor (e.g., a microprocessor, central processing unit (CPU), graphics processing unit (GPU), etc.) executing one or more computer readable instructions encoded or embedded on a computer readable storage medium (which excludes transitory medium) such as a physical memory device. The processor can additionally or alternatively execute computer readable instructions carried by transitory medium such as a carrier wave, a signal, or other transitory medium. The fixed-focus first stage beamformer 120 can also be implemented using simple analog circuitry to lower the power dissipated in the probe handle.

Figure 2:
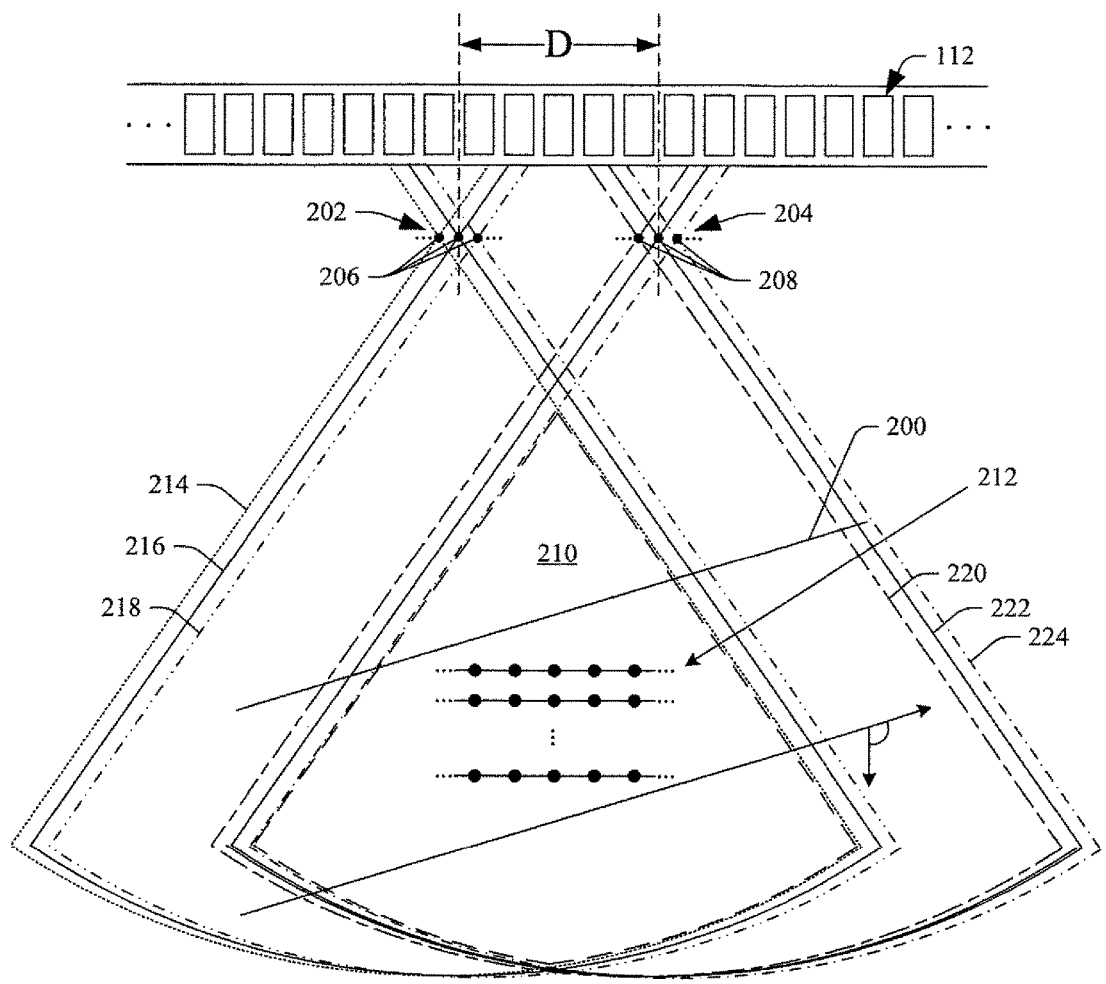
FIG. 2 shows an example imaging setup with a linear transducer array.

An example of the velocity processor 130 is discussed next in connection with FIG. 2 for a linear transducer array 112 and a vessel 200. Virtual apertures 202 and 204 are created with virtual sources 206 and 208 emulated using the fixed-focus emissions. The illustrated example expressly shows a total of six virtual sources 206 and 208, where each of the virtual apertures 202 and 204 includes three of the virtual sources (i.e., the virtual aperture 202 includes the virtual sources 206, and the virtual aperture 204 includes the virtual sources 208). The three virtual sources 206, going from left to right, respectively insonify regions 214, 216 and 218, and the three virtual sources 208, going from left to right, respectively insonify regions 220, 222 and 224. The virtual apertures 202 and 204 are located in front of the transducer array 112 and are separated by a non-zero distance "D."

The first stage beamformer 120 beamforms the low-resolution lines of data using static focus points located in the same positions as the virtual sources 206 and 208. That is, for each emission, a low-resolution line of data is beamformed in receive using a fixed focus located in the corresponding virtual source position. In general, K (an integer greater or equal to two) emissions are used to create the high-resolution image. FIG. 2 shows at least K=6. For each emission, a low-resolution RF line is beamformed in receive using a fixed focus located in the virtual source position. The emissions are in a predetermined order and continuously repeat, providing continuous data. Generally, 2-4 emissions can be used for lower velocities, and 20-30 emissions can be used for higher velocities.

The second stage beamformer 124 successively processes the low-resolution lines of data, applying weights to create a double-oscillating field in the whole imaging region (a region-of-interest (ROI) 210) at once. The wireless transmission of the ultrasound data from the probe 102 to the console 104 is enabled by the fact that only a single beamformed low-resolution line is transmitted for each emission, in contrast to transmitting in parallel the data from all the transducer elements. The weights weight the contributions from the low-resolution lines to create the double oscillating field in the high resolution image. The virtual sources 206 and 208 can be placed behind the transducer array 112 to increase the extent of the ROI 210 and visualize regions close to the transducer 112.

Neglecting the B-mode sequence, the pulse repetition frequency for the flow emissions is referred to as $f_{prf}^{flow}$. A maximum effective frame rate for the velocity estimation is therefore equal to $f_{prf-eff}^{flow}=f_{prf}^{flow}/K$. For each frame, the vector velocities are estimated in the whole ROI 210. Furthermore, the approach can be extended to high frame rate VFI by calculating a new estimate for each emission in a recursive manner, giving $f_{prf-eff}^{flow}=f_{prf}^{low}$. This approach does not require any angle compensation of prior knowledge on the beam-to-flow angle.

To estimate a velocity at a given point, the velocity processor 130 computes a lateral signal at a corresponding location in the high-resolution image. Signals from M (wherein M is a positive integer) of the high-resolution images are used to estimate the velocities. A lateral signal can be determined anywhere in the ROI 210. In the illustrated example, a set of lateral signals 212 at different depths are determined within the vessel 200. Each lateral signal is a single directional signal (or line of data) for a depth of interest and is transverse to the propagation direction. Where K=6, each line is constructed after 6 emissions.

A wavelength of the lateral oscillation is determined based on EQUATION 1:

$$\lambda_x = \frac{\lambda d}{D}, \qquad \text{Equation 1}$$

where $\lambda$ is a axial wavelength, d is the depth, D is the distance between the receiving apertures. The signal x(n, i) is beamformed at the depth of interest in the direction transverse to the direction of propagation of the ultrasound beam, where n is a sample index along the lateral direction, and i is an emission index.

A quadrature signal required for the velocity estimation is determined as shown in EQUATION 2:

$$y(n, i) = \mathcal{H}\{x(n, i)\}, \qquad \text{Equation 2:}$$

where $\mathcal{H}$ identifies the Hilbert transform. A complex signal $r_{sq}$ is determined by combining the in-phase and quadrature lateral beamformed signals as shown in Equation 3:

$$r_{sq}(n, i) = x(n, i) + jy(n, i), \qquad \text{Equation 3:}$$

where x(n; i) is the real part and y(n, i) is the imaginary part. A lateral wavelength for the emission i is calculated as shown in EQUATION 4:

$$\frac{1}{\lambda_x(i)} = f_x(i) = \frac{\sum_{f=-\frac{N}{2}}^{\frac{N}{2}} \frac{f}{N\Delta_x}|R_{sq}(f,i)|^2}{\sum_{f=-\frac{N}{2}}^{\frac{N}{2}} |R_{sq}(f,i)|^2}, \qquad \text{Equation 4}$$

where $R_{sq}(f)$ is a Fourier transform of the directional signal $r_{sq}(n)$ along the lateral dimension n, N is a number of Fourier coefficients, f is a sample index in the Fourier domain, and $\Delta_x$ is a lateral spatial sampling period. The lateral wavelength $\lambda_x$ can be averaged over a number of directional lines to improve the variance of the estimate.

Two new signals are created as shown in EQUATIONS 5 and 6:

$$r_1(n, i) = r_{sq}(n, i) + jr_{sqh}(n, i), \qquad \text{Equation 5:}$$

and $$r_2(n, i) = r_{sq}(n, i) - jr_{sqh}(n, i). \qquad \text{Equation 6:}$$

where $r_{sqh}$ denotes the Hilbert transform of the signal $r_{sq}$ along the axial dimension. From EQUATIONS 5 and 6, lag-1 autocorrelation functions can be determined as shown in EQUATIONS 7 and 8:

$$\hat{R}_1(1) = \frac{1}{MN_s}\sum_{i=0}^{M-2}\sum_{n=0}^{N_s} r_1^*(n, i)r_1(n, i+1), \qquad \text{Equation 7}$$

and $$\hat{R}_2(1) = \frac{1}{MN_s}\sum_{i=0}^{M-2}\sum_{n=0}^{N_s} r_2^*(n, i)r_2(n, i+1). \qquad \text{Equation 8}$$

In EQUATIONS 7 and 8, the autocorrelation estimates are averaged over the number of emissions M and the number of samples in the directional lines $N_S$ along the axial direction. In addition, the autocorrelation estimates in EQUATIONS 7 and 8 can be averaged over a number of directional lines to improve the variance of the estimate. The velocity processor 130 estimate the lateral and axial velocities respectively as shown in Equations 9 and 10:

$$v_x = \frac{\lambda_x}{2\pi 2T_{prf}} = \arctan\left(\frac{\Im\{R_1(1)\}\Re\{R_2(1)\} + \Im\{R_2(1)\}\Re\{R_1(1)\}}{\Re\{R_1(1)\}\Re\{R_2(1)\} - \Im\{R_1(1)\}\Im\{R_2(1)\}}\right), \qquad \text{Equation 9}$$

-continued and $$v_y = \frac{\lambda}{2\pi 4 T_{prf}} = \arctan\left(\frac{\Im\{R_1(1)\}\Re\{R_2(1)\} - \Im\{R_2(1)\}\Re\{R_1(1)\}}{\Re\{R_1(1)\}\Re\{R_2(1)\} + \Im\{R_1(1)\}\Im\{R_2(1)\}}\right).$$ Equation 10 where $T_{prf}$ denotes the pulse repetition period, $\Im$ denotes the real part, and $\Re$ denotes the imaginary part.

By using the approach described herein, the lateral wavelength $\lambda_x$ can be estimated for all the depths directly from the beamformed data, and no prediction is needed prior to the beamformation, making the approach self-calibrating. Furthermore, the approached described herein decouples the lateral oscillation wavelength from the apodization function, maintaining a low bias for the velocity estimation along the depths. Furthermore, the approach described herein only requires storing one line of data at a time so there is a reduction in the memory requirement for storing data relative to storing multiple lines of data.

Furthermore, the approach described herein provides high performance with a significant performance improvement in terms of operative time relative to cross-correlation approaches. More specifically, the autocorrelation approach described herein requires only one accumulation and no flow angle estimation. The cross-correlation approach requires a full cross-correlation of all permutations for each flow direction such that a signal with a length of N would require N accumulations times the number (e.g., 50-100) of flow directions (e.g., N*(50-100) calculations times the approached described herein). As such, the approach described herein is a technological improvement. Due to the reduced computational complexity, the approach also enables the possibility to implement synthetic aperture vector flow imaging in general-purpose ultrasound scanners.

Figure 3:
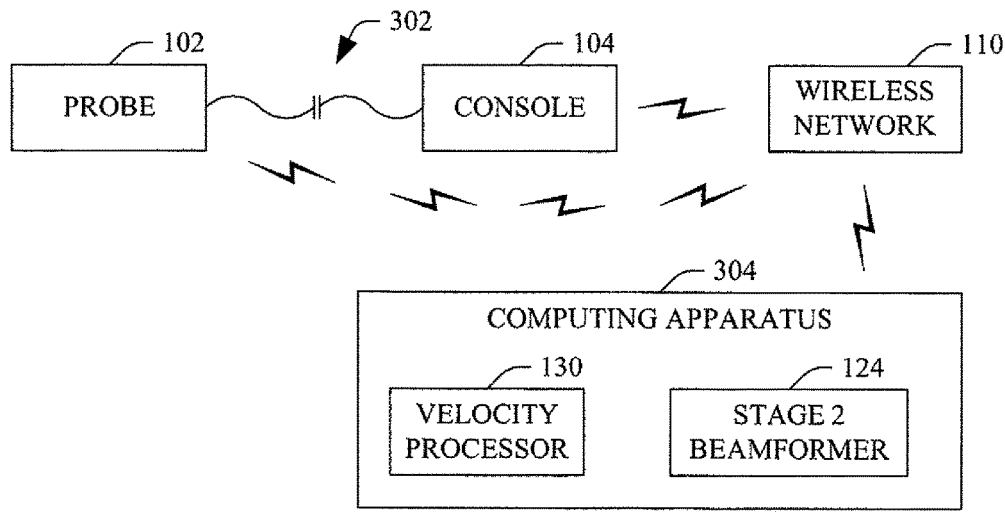
FIG. 3 schematically illustrates the example ultrasound imaging system in connection with a computing apparatus.

FIG. 3 schematically illustrates a variation of FIG. 1 in which the probe 102 and the console 104 interface via a hardwired connection 302 (e.g., a cable), and the console 104 wirelessly communicates the low resolution data to a computing apparatus 304, which includes the stage 2 beamformer 124 and the velocity processor 130, which process the low resolution data as described herein. In this instance, the stage 1 beamformer 120 can be in the probe 102 and/or the console 104. Where the stage 1 beamformer 120 is implemented in the probe 102 (e.g., in a handle thereof), the beamformer 120 can directly, wirelessly interface to the wireless network 110 and wirelessly communicate the low resolution data directly to the computing apparatus 304.

Figure 4:
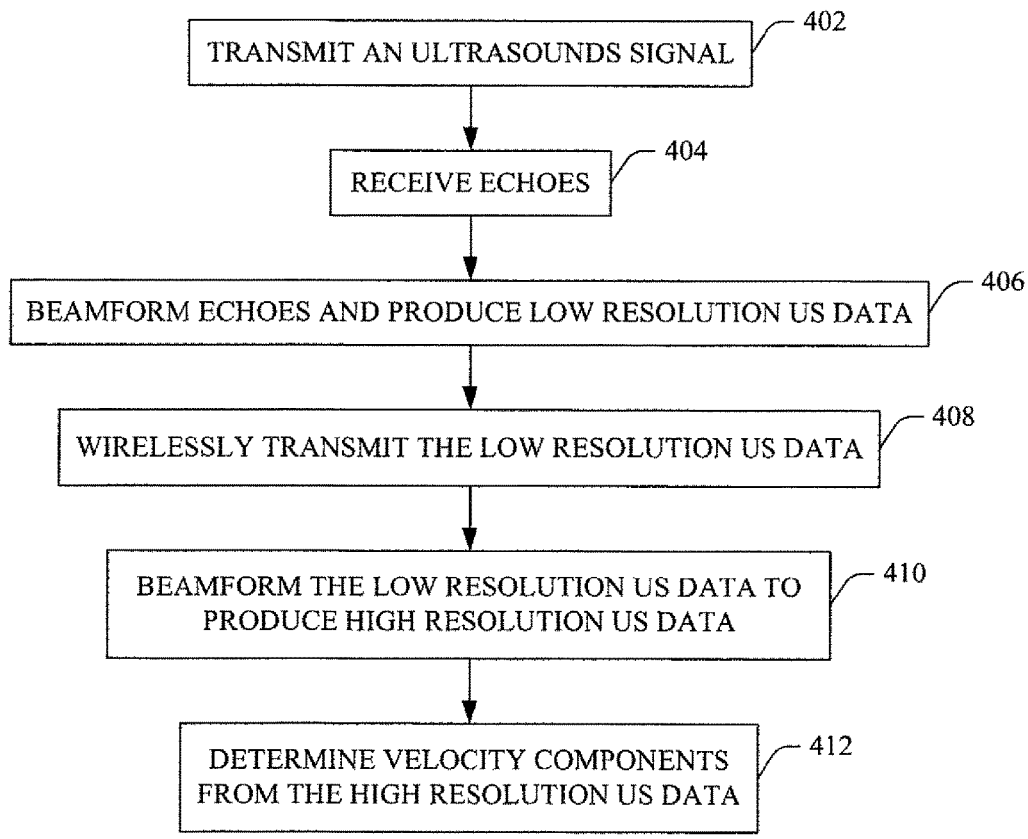
FIG. 4 illustrates a method in accordance with an embodiment herein.

FIG. 4 illustrates a method for estimating a velocity vector using a combination of TO and SASB.

It is to be understood that the following acts are provided for explanatory purposes and are not limiting. As such, one or more of the acts may be omitted, one or more acts may be added, one or more acts may occur in a different order (including simultaneously with another act), etc.

At 402, an ultrasound signal is transmitted as described herein.

At 404, echoes are received and converted to electrical signals as described herein.

At 406, the electrical signals are beamformed via a first stage beamformer to produce low resolution ultrasound data as described herein.

At 408, the low resolution ultrasound data is wirelessly transmitted to another device as described herein.

At 410, the low resolution ultrasound data is beamformed via a second stage beamformer to produce high resolution ultrasound data at the other device as described herein.

At 412, vector velocity values are determined from the high resolution ultrasound data at the other device as described herein.

At 414, an image and the vector velocity values are visually presented.

The methods described herein may be implemented via one or more processors executing one or more computer readable instructions encoded or embodied on computer readable storage medium (which excludes transitory medium) such as physical memory which causes the one or more processors to carry out the various acts and/or other functions and/or acts. Additionally, or alternatively, the one or more processors can execute instructions carried by transitory medium such as a signal or carrier wave.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
   a transducer array including a plurality of transducer elements configured to repeatedly emit in a predetermined pattern;
   a first beamformer configured to beamform echo signals received by the transducer array for each emission to produce a single low resolution line of data for each emission;
   a first communication interface configured to wirelessly transmit the single low resolution lines of data for each emission in series;
   a second communication interface configured to continuously wirelessly receive the transmitted single low resolution lines of data;
   a second beamformer configured to successively beamform the received single low resolution lines of data to produce high resolution ultrasound data; and
   a velocity processor configured to estimate vector velocity components from the high resolution ultrasound data in a lateral direction and an axial direction using an autocorrelation algorithm.

2. The system of claim 1, further comprising a probe, which includes the transducer array, the first beamformer, and the first communication interface.

3. The system of claim 2, further comprising a console, which includes the second communication interface, the second beamformer, and the velocity processor.

4. The system of claim 1, further comprising a probe and a console, which are in electrical communication via a hardwired path.

5. The system of claim 4, further a computing device, which includes the second communication interface, the second beamformer, and the velocity processor.

6. The system of claim 1, wherein the first communication interface transmits the low resolution ultrasound data at a rate less than 500 megabits per second.

7. The system of claim 1, wherein the ultrasound imaging system employs a combination of transverse oscillation and synthetic aperture sequential beamforming to produce to the low resolution ultrasound data, the high resolution ultrasound data, and the vector velocity estimates.

8. The system of claim 1, further comprising:
a display configured to display an ultrasound image and the vector velocity estimates.

9. The system of claim 1, wherein the vector velocity components include an axial component and a transverse component.

10. The system of claim 1, wherein the velocity processor calculates the vector velocity components directly from the high resolution ultrasound data without first determining a beam angle.

11. A method, comprising:
repeatedly emitting ultrasound signals in a predetermined pattern;
receiving echoes generated in response to the transmitted ultrasound signals;
beamforming the echoes, generating a single low resolution line of data for each emission;
wirelessly transmitting the single low resolution lines of data to another device;
wirelessly receiving the transmitted single low resolution lines of data with the other device;
successively beamforming the single low resolution lines of data, generating high resolution ultrasound image data; and
estimating, using an autocorrelation algorithm, vector velocity components from the high resolution ultrasound data.

12. The method of claim 11, wherein the low resolution line of data is transmitted over at least one of IEEE 802.11 ac, USB, Blue Tooth, or cellular.

13. The method of claim 12, wherein the low resolution line of data is wirelessly transmitted from a probe of an ultrasound imaging device to a console of the ultrasound imaging device.

14. The method of claim 12, wherein the low resolution line of data is transmitted from a console of an ultrasound imaging device to a computing system, which is not part of the ultrasound imaging device.

15. The method of claim 11, wherein the low resolution line of data is transmitted at a rate less than or equal to 500 megabits per second.

16. The method of claim 11, further comprising:
beamforming the low resolution line of data corresponding to at least two emissions.

17. The method of claim 16, further comprising:
beamforming the low resolution line of data corresponding to a first set of emissions for determining a first velocity of interest, and beamforming the low resolution line of data corresponding to a second set of emissions for determining a second velocity of interest, wherein the first set of emissions is fewer than the second set of emissions, and the first velocity if lower than the second velocity.

18. The method of claim 11, further comprising:
employing a combination of direct transverse oscillation and synthetic aperture sequential beamforming to produce to the low resolution ultrasound data, the high resolution ultrasound data, and the vector velocity estimates.

19. The method of claim 11, further comprising:
displaying an ultrasound image and the vector velocity estimates.

20. A non-transitory computer readable storage medium encoded with computer readable instructions, which, when executed by a processor of a computing system, cause the processor to:
transmit, via a transducer array, ultrasound signals in a predetermined pattern;
receive, via the transducer array, echoes generated in response to each transmission;
beamform the echoes for each transmission to generate a single low resolution line of data for each transmission;
wirelessly transmit the single low resolution lines of data to another device;
wirelessly receive the transmitted single low resolution lines of data with the other device;
successively beamform the single low resolution lines of data to generate high resolution ultrasound image data; and
estimate, using an autocorrelation algorithm, vector velocity components from the high resolution ultrasound data.

* * * * *